Patented July 27, 1943

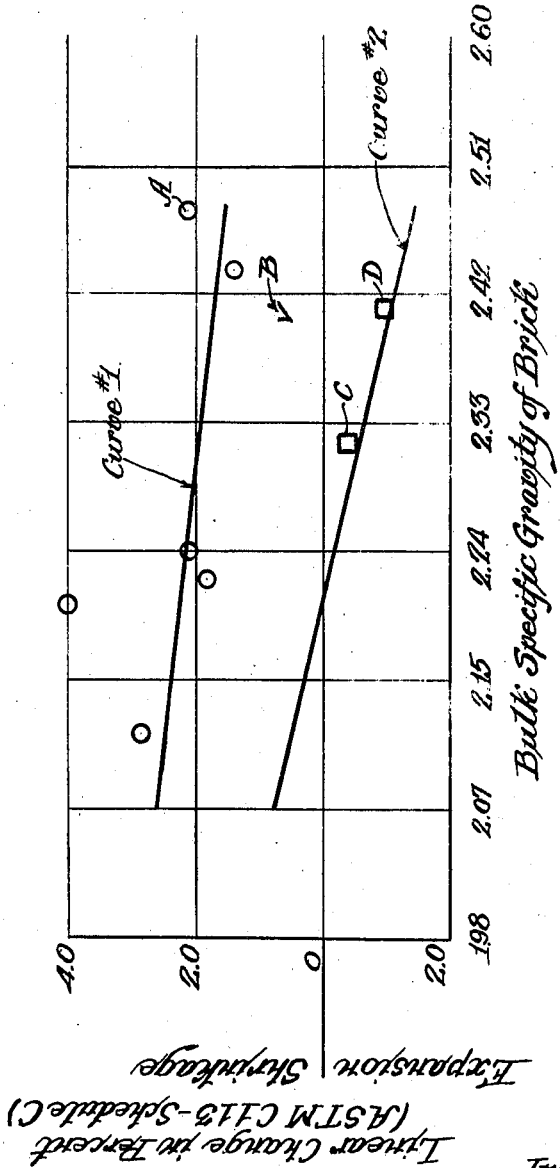

2,325,181

UNITED STATES PATENT OFFICE 2,325,181

HIGH ALUMINA REFRACTORY

Alex Edward Fitzgerald, Merion, Pa., assignor to General Refractories Company, Philadelphia, Pa., a corporation of Pennsylvania Application October 23, 1940, Serial No. 362,335

25 Claims. (Cl. 106—68)

The present invention relates to high alumina refractories and the process of producing them.

A purpose of the invention is to produce refractories containing more than 67% alumina from raw minerals which are essentially hydrated alumina by methods which are economical and render the refractories free from shrinkage at high temperature or subject to expansion at high temperature.

A further purpose is to obtain high density with freedom from shrinkage at high temperature in refractories containing more than 67% alumina manufactured from raw minerals which are essentially hydrated alumina.

A further purpose is to calcine without fusing a raw mineral which is essentially hydrated alumina, to mix with the calcined alumina a clay of quantity and silica content proper to cause expansion on firing above pyrometric cone 10, to mold the mix into brick, to fire the brick above pyrometric cone 10, and to stop firing while the brick still is capable of further expansion on reheating to 1600° C. for five hours.

A further purpose is to overcome excessive shrinkage in high alumina refractory brick produced from a raw mineral which is essentially hydrated alumina by calcining the raw mineral by itself at a temperature between pyrometric cones 16 and 30 inclusive, mixing the calcined alumina mineral with a proper quantity of uncalcined clay of proper silica content, forming the mix into brick and firing the brick at a temperature between pyrometric cones 10 to 23 inclusive, preferably firing at a temperature between pyrometric cones 10 and 16. Where the clay contains from 50 to 65% silica, from 15 to 30% of uncalcined flint clay will be employed, the preferable quantity being about 20% or above and the most desirable quantity being about 30%. Where the clay has a silica content of from 65% to 75%, from 7% to 25% of uncalcined clay will be used, preferably about 10%. Speaking generally, with uncalcined clay of silica content from 60% to 75%, from 7% to 30% of uncalcined clay will be employed.

The drawing shows a series of curves useful in explaining the invention.

High alumina refractories, containing 67% or more of alumina, are particularly desirable because of their ability to withstand very high temperatures without softening or melting, and their chemical resistance to attack by basic materials such as lime, dolomite, Portland cement clinker, iron oxide, and alkalies. Fused alumina refractories may be obtained by fusing very pure high aluminous minerals under the extremely high temperature of the electric furnace. These fused alumina refractories are substantially free from shrinkage but their exceedingly high expense precludes their use in ordinary tonnage production.

Efforts have been made for many years to produce satisfactory high alumina refractories from raw materials which are essentially hydrated alumina by ordinary ceramic methods such as calcining without fusing and firing without fusing, and a number of such products are available on the market. The existing commercial products of this class have been of limited utility because of excessive shrinkage at high temperatures and in some cases also because of low density (high porosity). In the previous efforts made to overcome these difficulties, high expense has been again encountered due to the necessity to fire the finished refractory at excessive temperatures, to grind the raw materials to extremely fine states of subdivision and to calcine added ingredients other than the hydrated alumina itself.

By the present invention high alumina refractories are obtained, containing at least 67% of alumina, by inexpensive and normal ceramic methods, while at the same time excessive high-temperature shrinkage is overcome and high density is obtained. Any raw mineral may be employed which is essentially hydrated alumina. The commercial minerals of this type are primarily diaspore, bauxite and gibbsite, varying in composition when pure from 85% of alumina and 15% of chemically combined water to 65.3% of alumina and 45.7% of chemically combined water. These materials are calcined before inclusion in the high alumina brick, but the calcining temperature is markedly below the fusing temperature used in making fused alumina refractories. It is also proper to employ somewhat more impure materials for calcined alumina than those used in making fused alumina. In the present invention the calcining of the hydrated alumina is accomplished in a conventional oil, gas or coal fired kiln at a temperature of from pyrometric cone 16 to 30 inclusive.

In the conventional procedure for the manufacture of high alumina refractories the raw hydrated alumina mineral, such as diaspore, bauxite or gibbsite, is crushed and mixed with bonding clay. The normal procedure is to add about 10% of raw bonding clay containing about 35 to 45% of alumina. The mixture is molded into the desired shape and the product is fired either in a continuous or an intermittent kiln. When placed in service at a service temperature frequently no higher than that at which the brick was fired, the commercial high alumina bricks under discussion shrink excessively, causing early failure. The shrinkage is most pronounced in the commercial high alumina bricks of high density, that is those of specific gravity above 2.24.

This shrinkage has hithertofore generally been attributed to insufficient shrinkage of the diaspore during calcining, and various procedures have been devised to obtain more shrinkage and greater density in calcining the diaspore. Higher calcining temperatures have been used and fluxes, such as phosphate rock, have been added. However, in spite of the use of denser calcined alumina and the production of bricks containing such denser calcined alumina, the bricks have continued to shrink and unsatisfactory results have been obtained.

The present inventor has discovered that the excessive shrinkage of high alumna brick may be corrected by inclusion in the brick of the proper kind of clay in the proper amounts. No special precaution need be employed to obtain abnormally dense or abnormally preshrunk calcined alumina, if the proper character and quantity of clay be employed.

The generally accepted test to determine shrinkage or resistance to shrinkage of high alumina bricks is that prescribed by the American Society for Testing Materials, text C 113, schedule C. The test bricks are heated to 1600° C. (2912° F.) over a period of five hours and held at this temperature for five hours. The bricks are then cooled and measured and their percentage linear shrinkage calculated on the basis of their length before and after refiring in this test. The curves in the figure show percentage linear change, whether as shrinkage or expansion, as the ordinate plotted against the bulk specific gravity of the brick tested as measured at the beginning of the test. The normal bulk specific gravity for high alumina bricks produced by ceramic methods is 2.07 to 2.15 grams per cubic centimeter, equivalent to a weight of 7.6 to 7.9 pounds for a standard 9 x 4½ x 2½ inch brick. Any specific gravity substantially exceeding 2.07 to 2.15 is considered high and any such brick is generally referred to as a dense brick.

Curve 1, whose points are represented by circles, shows the shrinkage characteristics of conventional high alumina brick available on the market and manufactured by the standard companies in this field. It will be seen that the shrinkages of these specimens are all approximately 2% or higher, and this frequently gives cause for complaint in service.

By the present invention it is possible to reduce the shrinkages to 1% or less without resorting to unusual or expensive procedures.

Curve 2 shows the effect on linear change of additions of various quantities of clays of particular compositions. In curve 2 the shrinkages are all less than 1% and are from 1.8% to 2.9% less than the corresponding shrinkage values for conventional bricks.

For example, by mixing the calcined alumina obtained from raw hydrated alumina mineral with a clay of approximately 50% silica and 45% alumina in the proportions of 90% calcined alumina and 10% clay, a product shrinking 2.2% was obtained as shown by the point A on curve 1. Where the proportions were changed to 80% of calcined alumina to 20% of flint clay, the shrinkage was reduced to 0.6% as shown by the point B and where the proportions were changed to 70% of calcined alumina and 30% of flint clay, shrinkage was entirely eliminated and the brick expanded 0.4% as shown by the point C on curve 2. With each 10% increase in flint clay and corresponding reduction in calcined hydrated alumina mineral, the shrinkage was reduced by an average of 1.3% in spite of reduction in density of the brick. Based on equal density (see table below), this reduction in shrinkage was actually 1.8% for each 10% increase in this clay. The effect of the quantity of the clay will be evident from these experiments.

The same effect which was obtained in these experiments by adding a relatively large quantity of flint clay having a silica content of about 50% may be obtained by adding a smaller quantity of clay higher in silica. By adding only 10% of a clay containing 73% of silica and 24% of alumina, it was found that substantially the same effect (point D) in reducing shrinkage was obtained as where 30% of a flint clay containing 50% of silica was added. These results in terms of bricks of equal bulk specific gravities may be summarized as follows:

LINEAR CHANGE (A. S. T. M. C113—Schedule C)

[Based on equivalent bulk specific gravities]

| | | | | |
|---|---|---|---|---|
| Raw hydrous alumina mineral in calcined form _____percent__ | 90 | 80 | 70 | 90 |
| Clay containing 50% silica _____do____ | 10 | 20 | 30 | __ |
| Clay containing 73% silica _____do____ | __ | __ | __ | 10 |
| Linear change _____ | [1]2.2 | [1]0.4 | [2]1.4 | [2]1.2 |

[1] Shrinkage.
[2] Expansion.

This table, based on bricks of equal bulk specific gravities, best shows the effects of change in quantity of a clay containing 50% silica or employing a clay containing 73% of silica.

In brick produced according to the present invention, the linear dimension of the refractory after reheating at 1600° C. for five hours is from 99 to 102% of the initial dimension. Thus where the final dimension is 99% of the initial dimension, there is 1% shrinkage and where the final dimension is 102% of the initial dimension, there is 2% expansion.

It is important that the great bulk of the clay be used in raw or uncalcined form, although, of course, it will be understood that the clay may be preliminarily dried to remove moisture, say at a temperature below 300° C. (572° F.). If the bulk of the clay included in the brick were in the form of calcined clay or grog, the chemical reaction with the calcined alumina mineral which causes expansion during reheating or counteracts shrinkage during reheating could not take place, the ability to cause expansion being a characteristic of the raw clay. It is further undesirable to include calcined clay in the refractory mix because calcining destroys whatever bonding property the clay may possess.

In the prior art it has been proposed to mix the alumina mineral with clay prior to calcining and calcine the alumina mineral and clay together. This is highly undesirable and to be avoided in the procedure according to the present invention, since if the alumina mineral and clay be calcined together, a chemical reaction will take place during the calcining causing expansion which makes it impossible to obtain a dense calcine, and also the ability of the clay to counteract shrinkage in the brick will be lost during the calcining. Furthermore, the inclusion of the clay with the alumina during calcining, besides being definitely undesirable, is costly.

The clay employed in the present invention may range from 50 to 75% silica content, but the quantity of clay required is interrelated to the silica content of the clay, although not in a simple relation.

Of flint clays containing from 50 to 65% silica it is desirable to employ from 15 to 30%, the quantity preferably being about 20% and most desirably about 30%. A content of approximately 30% of flint clay containing from 50 to 65% silica will insure an expanding brick.

Of uncalcined fire clay containing from 65 to 75% of silica, from 7 to 25% will desirably be employed, from 10 to 20% being the more desirable range and for best results the clay content being about 10%. Very good results have been obtained using Woodbury (Pennsylvania) fire clay, a clay containing from 65 to 75% of silica. The siliceous type of clay known as Woodbury occurs also in New Jersey.

With uncalcined fire clay containing from 60 to 75% of silica, the quantity used will range from 7 to 30%, the higher quantities normally being employed with the clay of lower silica content within this range.

I have discovered that only 10% to 15% of a raw fire clay containing 65 to 75% of silica need be used to substantially eliminate shrinkage in a high alumina brick of the type under discussion. This is highly useful since with calcined alumina of the same alumina content and same density it is possible to produce brick of higher alumina content and higher density than where larger quantities of uncalcined flint clay of lower silica content are employed.

If we assume that a brick of 72% alumina content is required, this can be made in one of two ways in accordance with the present invention. Seventy per cent of raw hydrous alumina mineral in calcined form may be used with 30% of uncalcined flint clay containing about 50% silica, or 90% of raw hydrous alumina mineral in calcined form may be used with 10% of uncalcined fire clay containing say 73% of silica. Intermediate amounts of raw hydrous alumina mineral in calcined form may be used with intermediate quantities of clay where the silica content of the clay lies between 50 and 75%. With a fire clay containing more than 73% of silica, more than 90% of raw hydrous alumina mineral in calcined form may be used.

If the mix contains 70% of raw hydrous alumina mineral in calcined form with 30% of a clay containing 50% of silica as above described, the alumina content of the calcine should be approximately 83%. If the mix contains 90% of raw hydrous alumina mineral in calcined form and 10% of a clay containing 73% of silica (24% of alumina), the alumina content of the calcine need be only 77%. Thus it will be seen that the alumina content of the available diaspore, bauxite or gibbsite determines the question as to whether one clay should be used rather than another in the present invention.

The preparation of the calcine from the raw hydrous alumina mineral will vary according to the character of the raw material, the additions of fluxes made to facilitate shrinkage during calcining and/or the density required in the calcine. If raw hydrous alumina mineral is available in lump form and no fluxes need be added, the lumps may be placed conveniently in intermittent or continuous kilns and calcined. If the raw hydrous alumina mineral is not available in lump form or if fluxes are to be added, the raw hydrous alumina mineral may be crushed, ground, molded into lumps (dobies) and set before calcining. If preferred, finely divided materials may be calcined, as for example in a rotary kiln. Any well-known flux such as magnesite or phosphate rock may be employed to facilitate shrinkage. If the materials are very finely ground, as for example to 65 or 100 mesh per linear inch and made into dobies, shrinkage is further facilitated.

By facilitating shrinkage is meant, to cause or bring about more shrinkage at a given temperature of calcining, or a given shrinkage at a lower temperature of calcining.

Where materials of different alumina content must be blended to obtain the desired alumina percentage, this may be done after calcining or if the materials are finely ground, before calcining.

The density which must be obtained from calcining the raw hydrous alumina minerals depends upon the amount of clay to be added and the density required in the finished brick. For a given density in the finished brick the density of the calcined material must be increased as the amount of clay is increased. For any given mix the density of the calcined material must be increased if the density of the finished brick is to be increased. For instance, to produce a brick having a density of 2.24 grams per cubic centimeter from a mix containing 70% of raw hydrous alumina mineral in calcined form and 30% of uncalcined fire clay, the bulk specific gravity of the calcined alumina must be 2.58. If, on the other hand, the mix contains 90% of raw hydrous alumina mineral in calcined form and 10% of clay, the bulk specific gravity of the calcined alumina need be only 2.32. If the density required in the finished brick is 2.41 grams per cubic centimeter, the density of the raw hydrous alumina mineral in calcined form must be 2.93 for the mix of 70% calcined alumina and 30% fire clay, and must be 2.67 for the mix of 90% calcined alumina and 10% fire clay. Higher density of the calcine is obtained by higher firing temperature, finer grinding prior to calcining, compact molding of the dobies, and addition of fluxes.

There is a definite advantage in obtaining bulk specific gravities of the finished brick in excess of 2.24, and such brick can readily be produced in accordance with the invention. In fact, bulk specific gravities as high as 2.42 or higher may be obtained by the procedure of the invention.

I find that the calcining temperature may range between pyrometric cones 16 and 30 inclusive. It is desirable that the particles of the mix be ground and graded as to size. Various procedures for sizing are available. The entire batch may be ground and screened to a particle size of 6 to 8 mesh per linear inch, under which condition 95% of the particles will pass 6 to 8 mesh. On the other hand, the calcined alumina may be 6 or 8 mesh per linear inch and the clay may be considerably finer, for example, below 35 mesh per linear inch. On the other hand, part of the calcined alumina and part of the clay may be ground to 35 mesh or finer, the remaining portion of the mix being of the order of 6 or 8 mesh. For best results certain intermediate sizes of particles should be entirely or almost entirely eliminated to secure gap sizing. A typical screen analysis of the entire mix would be as follows:

| | Per cent |
|---|---|
| Retained on 28 mesh | 45 to 50 |
| Retained on 48 mesh | 10 to 0 |
| Passing through 48 mesh | 45 to 50 |
| Total | 100 |

If the particles passing 28 mesh and retained on 48 mesh are reduced to a minimum in normal grinding and screening, the amount of coarse particles retained on 28 mesh and fine particles passing 48 mesh may be varied to suit the requirements. Preferably no particles larger than 3 mesh will be employed. The coarse particles retained on 28 mesh may vary from 30 to 70% and the fine particles passing through 48 mesh may vary from 70 to 30%. It is preferred to include all the clay in the fine particles. By gap sizing the product is made more uniform and better in appearance.

There are various alternative procedures which may be used in preparing and molding the mix. The particles of calcined alumina and clay, suitably sized, can be intermixed and moistened with water during grinding and screening, or in a conventional pug mill or pan mixer after grinding and screening. The best kown pan type mixers are the Simpson, Lancaster and Clearfield, but many other types are available.

During the mixing some temporary bond such as glutrin, goulac, dextrin or the like may be added to provide high strength and hardness after molding and drying. The molding may be accomplished by hand molding methods, with air hammers or with presses of any suitable type. For best results the molding pressures should exceed 1500 pounds per square inch.

Following molding the refractory may optionally be dried before firing.

Firing may be accomplished in intermittent or continuous kilns using firing temperatures ranging between pyrometric cones 10 and 23 inclusive. In normal operation the firing temperature will range from pyrometric cone 10 to 16 inclusive. The expansion effect of the raw fire clay is effective during firing at low temperature (as low as pyrometric cone 10), and continues as long as excessive firing temperatures are not used. If the firing temperature is carried above pyrometric cone 23, the expansion effect of the fire clay is destroyed, and the brick will exhibit excessive shrinkage when reheated to 1600° C. for five hours. If the firing be stopped at pyrometric cone 23 or below, the fired brick will be of low reheat shrinkage or will expand if reheated to 1600° C. for five hours. There is no advantage and possibly a slight disadvantage in firing above pyrometric cone 16 but there is a very definite disadvantage in firing above pyrometric cone 23.

It is desired to retain, after firing, the capability of expanding during reheating of the brick. An important advantage of the product of the present invention is that it develops high strength and hardness with elimination of serious shrinkage by firing at these very moderate temperatures, rather than requiring the high firing temperatures of some of the prior art processes. High firing temperatures are not only expensive to maintain, but they increase the losses in firing and reduce the accuracy of sizing of the fired shapes.

In many prior art firing procedures for high alumina brick it has been necessary to employ "box setting," that is, supporting of unfired bricks on previously fired bricks to avoid warping, twisting and other deformation during firing. In the present invention box setting is not necessary and economy results by avoiding it. The negligible shrinkage of the bricks in the present process makes it possible to meet severe size specifications with ease.

While the fundamental mix of the present invention employs raw hydrous alumina minerals in calcined form, a small amount, up to 10% of the mix, may be in raw form. Likewise, while the fundamental mix of the invention employs uncalcined or raw fire clay, a small amount, up to one-fourth of the quantity of fire clay used, may be in calcined form. These changes, while permissible, are preferably to be avoided.

All of the percentage compositions stated herein are percentages by weight on a calcined basis notwithstanding that the particular materials referred to may be used in a raw or uncalcined form. All mesh sizes stated herein are Tyler standard mesh per linear inch.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. The process of producing high alumina refractory, which comprises calcining a raw mineral which is essentially hydrated alumina by itself without fusion, mixing the calcined alumina mineral with from 7 to 30% of uncalcined clay containing from 60 to 75% silica, molding the mix, firing the mix at a temperature above pyrometric cone 10 and stopping the firing while the refractory is still capable of further expansion on reheating.

2. The process of producing high alumina refractory, which comprises calcining a raw mineral which is essentially hydrated alumina by itself without fusion, mixing the calcined alumina mineral with from 15 to 30% of uncalcined flint clay containing from 50 to 65% silica, molding the mix, firing the mix at a temperature above pyrometric cone 10 and stopping the firing while the refractory is still capable of further expansion on reheating.

3. The process of producing high alumina refractory, which comprises calcining a raw mineral which is essentially hydrated alumina by itself without fusion, mixing the calcined alumina mineral with from 7 to 25% of uncalcined clay containing from 65 to 75% silica, molding the mix, firing the mix at a temperature above pyrometric cone 10 and stopping the firing while the refractory is still capable of further expansion on reheating.

4. The process of producing a refractory containing more than 67% alumina having a linear dimension after reheating to 1600° C. for five hours of from 99 to 102% of the initial dimension, from a raw mineral which is essentially hydrated alumina, which comprises calcining the raw mineral which is essentially hydrated alumina by itself at a temperature between pyrometric cones 16 and 30 inclusive, mixing the calcined alumina mineral with from 7 to 30% of uncalcined clay containing from 60 to 75% silica, forming the mix into brick and firing the brick at a temperature between pyrometric cones 10 and 23 inclusive.

5. The process of producing a diaspore refractory containing more than 67% alumina and having a linear dimension after reheating to 1600° C. for five hours of from 99 to 102% of the initial dimension, which comprises calcining diaspore by itself at a temperature between pyrometric cones 16 and 30 inclusive, mixing the calcined diaspore with from 7 to 30% of uncalcined clay containing from 60 to 75% silica, forming the mix into brick and firing the brick at a temperature between pyrometric cones 10 and 23 inclusive.

6. The process of producing a bauxite refractory containing more than 67% alumina and having a linear dimension after reheating to 1600° C. for five hours of from 99 to 102% of the initial dimension, which comprises calcining bauxite by itself at a temperature between pyrometric cones 16 and 30 inclusive, mixing the calcined bauxite with from 7 to 30% of uncalcined clay containing from 60 to 75% silica, forming the mix into brick and firing the brick at a temperature between pyrometric cones 10 and 23 inclusive.

7. The process of producing a gibbsite refractory containing more than 67% alumina and having a linear dimension after reheating to 1600° C. for five hours of from 99 to 102% of the initial dimension, which comprises calcining gibbsite by itself at a temperature between pyrometric cones 16 and 30 inclusive, mixing the calcined gibbsite with from 7 to 30% of uncalcined clay containing from 60 to 75% silica, forming the mix into brick and firing the brick at a temperature between pyrometric cones 10 and 23 inclusive.

8. The process of producing a refractory containing more than 67% alumina having a linear dimension after reheating to 1600° C. for five hours of from 99 to 102% of the initial dimension and of high density from a raw mineral which is essentially hydrated alumina, which comprises calcining the raw mineral which is essentially hydrated alumina by itself at a temperature between pyrometric cones 16 and 30 inclusive, mixing the calcined alumina mineral with from 15 to 30% of uncalcined flint clay containing from 50 to 65% silica, forming the mix into brick and firing the brick at a temperature between pyrometric cones 10 and 23 inclusive.

9. The process of producing a refractory containing more than 67% alumina having a linear dimension after reheating to 1600° C. for five hours of from 99 to 102% of the initial dimension and having a bulk specific gravity in excess of 2.24 from a raw mineral which is essentially hydrated alumina, which comprises calcining the raw mineral which is essentially hydrated alumina by itself at a temperature between pyrometric cones 16 and 30 inclusive, mixing the calcined alumina mineral with about 20% of uncalcined flint clay containing from 50 to 65% silica, forming the mix into brick and firing the brick at a temperature between pyrometric cones 10 and 23 inclusive.

10. The process of producing a refractory containing more than 67% alumina which permanently expands on reheating to 1600° C. for five hours and has a bulk specific gravity in excess of 2.24 from a raw mineral which is essentially hydrated alumina, which comprises calcining the raw mineral which is essentially hydrated alumina by itself at a temperature between pyrometric cones 16 and 30 inclusive, mixing the calcined alumina mineral with about 30% of uncalcined flint clay containing from 50 to 65% silica, forming the mix into brick and firing the brick at a temperature between pyrometric cones 10 and 23 inclusive.

11. The process of producing a diaspore refractory containing more than 67% alumina having a linear dimension after reheating to 1600° C. for five hours of from 99 to 102% of the initial dimension and having a bulk specific gravity in excess of 2.24, which comprises calcining diaspore by itself at a temperature between pyrometric cones 16 and 30 inclusive, mixing the calcined diaspore with from 15 to 30% of uncalcined flint clay containing from 50 to 65% silica, forming the mix into brick and firing the brick at a temperature between pyrometric cones 10 and 16 inclusive.

12. The process of producing a bauxite refractory containing more than 67% alumina having a linear dimension after reheating to 1600° C. for five hours of from 99 to 102% of the initial dimension and having a bulk specific gravity in excess of 2.24, which comprises calcining bauxite by itself at a temperature between pyrometric cones 16 and 30 inclusive, mixing the calcined bauxite with from 15 to 30% of uncalcined flint clay containing from 50 to 65% silica, forming the mix into brick and firing the brick at a temperature between pyrometric cones 10 and 16 inclusive.

13. The process of producing a gibbsite refractory containing more than 67% alumina having a linear dimension after reheating to 1600° C. for five hours of from 99 to 102% of the initial dimension and having a bulk specific gravity in excess of 2.24, which comprises calcining gibbsite by itself at a temperature between pyrometric cones 16 and 30 inclusive, mixing the calcined gibbsite with from 15 to 30% of uncalcined flint clay containing from 50 to 65% silica, forming the mix into brick and firing the brick at a temperature between pyrometric cones 10 and 16 inclusive.

14. The process of producing a refractory containing more than 67% alumina having a linear dimension after reheating to 1600° C. for five hours of from 99 to 102% of the initial dimension and of high density from a raw mineral which is essentially hydrated alumina, which comprises calcining the raw mineral which is essentially hydrated alumina by itself at a temperature between pyrometric cones 16 and 30 inclusive, mixing the calcined alumina mineral with from 7 to 25% of uncalcined clay containing from 65 to 75% silica, forming the mix into brick and firing the brick at a temperature between pyrometric cones 10 and 23 inclusive.

15. The process of producing a refractory containing more than 67% alumina having a linear dimension after reheating to 1600° C. for five hours of from 99 to 102% of the initial dimension and of high density from a raw mineral which is essentially hydrated alumina, which comprises calcining the raw mineral which is essentially hydrated alumina by itself at a temperature between pyrometric cones 16 and 30 inclusive, mixing the calcined alumina mineral with about 10% of uncalcined clay containing from 65 to 75% silica, forming the mix into brick and firing the brick at a temperature between pyrometric cones 10 and 23 inclusive.

16. The process of producing a refractory containing more than 67% alumina having a linear dimension after reheating to 1600° C. for five hours of from 99 to 102% of the initial dimension and of high density from a raw mineral which is essentially hydrated alumina, which comprises calcining the raw mineral which is essentially hydrated alumina by itself at a temperature between pyrometric cones 16 and 30 inclusive, mixing the calcined alumina mineral with about 10% Woodbury clay, forming the mix into brick and firing the brick at a temperature between pyrometric cones 10 and 23 inclusive.

17. The process of producing a diaspore refractory containing more than 67% alumina having a linear dimension after reheating to 1600° C. for five hours of from 99 to 102% of the initial dimension and having a bulk specific gravity in excess of 2.24, which comprises calcining the diaspore by itself at a temperature between pyrometric cones 16 and 30 inclusive, mixing the calcined diaspore with from 7 to 25% of uncalcined clay containing from 65 to 75% silica, forming the mix into brick and firing the brick at a temperature between pyrometric cones 10 and 16 inclusive.

18. The process of producing a bauxite refractory containing more than 67% alumina having a linear dimension after reheating to 1600° C. for five hours of from 99 to 102% of the initial dimension and having a bulk specific gravity in excess of 2.24, which comprises calcining the bauxite by itself at a temperature between pyrometric cones 16 and 30 inclusive, mixing the calcined bauxite with from 7 to 25% of uncalcined clay containing from 65 to 75% silica, forming the mix into brick and firing the brick at a temperature between pyrometric cones 10 and 16 inclusive.

19. The process of producing a refractory containing more than 67% alumina having a linear dimension after reheating to 1600° C. for five hours of from 99 to 102% of the initial dimension and having a high density, from a raw mineral which is essentially hydrated alumina, which comprises calcining the raw mineral which is essentially hydrated alumina by itself at a temperature between pyrometric cones 16 and 30 inclusive, forming from the calcined alumina and uncalcined flint clay containing from 50 to 65% silica, a mix containing from 15 to 30% of uncalcined flint clay having from 30 to 70% of particles between 3 and 28 mesh per linear inch and from 70 to 30% of particles below 48 mesh per linear inch, molding the mix into brick and firing the brick at a temperature between pyrometric cones 10 and 23 inclusive.

20. The process of producing a refractory containing more than 67% alumina having a linear dimension after reheating to 1600° C. for five hours of from 99 to 102% of the initial dimension and having a high density, from a raw mineral which is essentially hydrated alumina, which comprises calcining the raw mineral which is essentially hydrated alumina by itself at a temperature between pyrometric cones 16 and 30 inclusive, forming from the calcined alumina and uncalcined flint clay containing from 65 to 75% silica, a mix containing from 7 to 25% of uncalcined flint clay having from 30 to 70% of particles between 3 and 28 mesh per linear inch and from 70 to 30% of particles below 48 mesh per linear inch, molding the mix into brick and firing the brick at a temperature between pyrometric cones 10 and 23 inclusive.

21. A fired refractory brick containing more than 67% alumina having a bulk specific gravity in excess of 2.24 and comprising a raw mineral which is essentially hydrated alumina in calcined unfused form and from 15 to 30% of previously uncalcined flint clay containing from 50 to 65% of silica, the brick having a linear dimension after reheating to 1600° C. for five hours of from 99 to 102% of the initial dimension.

22. A fired refractory brick containing more than 67% alumina having a bulk specific gravity in excess of 2.24 and comprising a raw mineral which is essentially hydrated alumina in calcined unfused form and from 7 to 25% of previously uncalcined clay containing from 65 to 75% of silica, the brick having a linear dimension after reheating to 1600° C. for five hours of from 99 to 102% of the initial dimension.

23. A fired diaspore refractory brick containing more than 67% alumina, having a bulk specific gravity in excess of 2.24 and comprising diaspore in calcined unfused form and from 7 to 30% of uncalcined clay containing from 60 to 75% silica, the brick permanently expanding on reheating at 1600° C. for five hours.

24. As an intermediate product of manufacture, a refractory brick containing in excess of 67% alumina which consists of raw hydrated alumina mineral in calcined unfused form and from 15 to 30% of uncalcined flint clay containing from 50 to 65% of silica.

25. As an intermediate product of manufacture, a refractory brick containing in excess of 67% alumina which consists of raw hydrated alumina mineral in calcined unfused form and from 7 to 25% of uncalcined clay containing from 65 to 75% silica.

ALEX EDWARD FITZGERALD.